United States Patent
Honkura et al.

(10) Patent No.: US 7,750,776 B2
(45) Date of Patent: Jul. 6, 2010

(54) ANISOTROPIC BONDED MAGNET FOR USE IN A 4-POLE MOTOR, A MOTOR EMPLOYING THAT MAGNET, AND AN ALIGNMENT PROCESS APPARATUS FOR THE ANISOTROPIC BONDED MAGNET FOR USE IN A 4-POLE MOTOR

(75) Inventors: Yoshinobu Honkura, Aichi-ken (JP); Hiroshi Matsuoka, Aichi-ken (JP); Masahiko Kato, Aichi-ken (JP); Daisuke Nagaya, Aichi-ken (JP)

(73) Assignee: Aichi Steel Corporation, Aichi-ken (JP)

( * ) Notice: Subject to any disclaimer, the term of this patent is extended or adjusted under 35 U.S.C. 154(b) by 0 days.

(21) Appl. No.: 12/320,686

(22) Filed: Feb. 2, 2009

(65) Prior Publication Data

US 2009/0146518 A1 Jun. 11, 2009

Related U.S. Application Data

(62) Division of application No. 10/560,435, filed on Dec. 14, 2005, now Pat. No. 7,592,889.

(51) Int. Cl.
*H01F 7/02* (2006.01)
(52) U.S. Cl. .................. 335/302; 335/306; 310/156.43
(58) Field of Classification Search ......... 335/302–306; 29/607, 608, 602.1; 264/427–429; 310/156.01–156.84
See application file for complete search history.

(56) References Cited

U.S. PATENT DOCUMENTS 2,903,329 A * 9/1959 Weber .......................... 425/84

3,694,115 A 9/1972 Steingroever (Continued)

FOREIGN PATENT DOCUMENTS

DE 39 13276 A1 10/1990

(Continued)

OTHER PUBLICATIONS

European Search Report dated Oct. 17, 2005.

(Continued)

*Primary Examiner*—Lincoln Donovan
*Assistant Examiner*—Bernard Rojas
(74) *Attorney, Agent, or Firm*—McGinn IP Law Group, PLLC

(57) ABSTRACT

A hollow cylindrically shaped anisotropic bonded magnet for use in a 4-pole motor, is formed by molding anisotropic rare-earth magnet powder with resin. The alignment distribution of the anisotropic rare-earth magnet powder in a cross section perpendicular to the axis of the anisotropic bonded magnet is in the normalized direction of the cylindrical side of the hollow cylindrical shape in the main region of a polar period, and in a transition region in which the direction of the magnetic pole changes, steadily points towards a direction tangential to the periphery of the cylindrical side at points closer to the neutral point of the magnetic pole, and becomes a direction tangential to the periphery of the cylindrical side at that neutral point, and steadily points toward the normalized direction of the cylindrical side at points farther away from the neutral point.

12 Claims, 11 Drawing Sheets

A-A' Cross-sectional Diagram

U.S. PATENT DOCUMENTS

Figure 1:
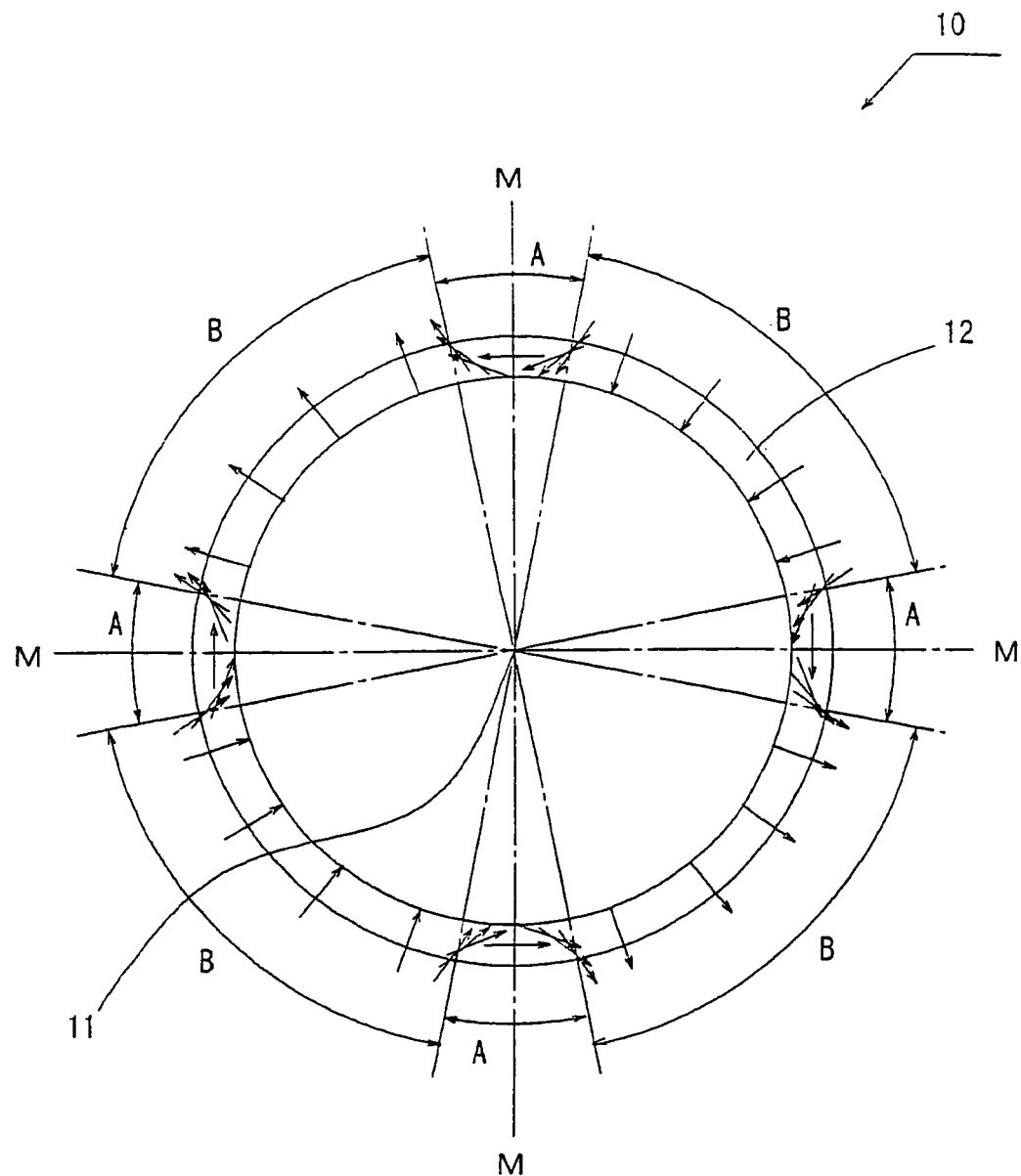

| | | | |
|---|---|---|---|
| 4,185,262 | A | 1/1980 | Watanabe et al. |
| 4,547,758 | A | 10/1985 | Shimizu et al. |
| 4,604,042 | A | 8/1986 | Tanigawa et al. |
| 4,739,203 | A | 4/1988 | Miyao et al. |
| RE34,229 | E | 4/1993 | Shimizu et al. |
| 6,111,332 | A | 8/2000 | Post |
| 6,700,247 | B2 | 3/2004 | Masuzawa et al. |
| 6,858,960 | B1 | 2/2005 | Muszynski |
| 6,917,132 | B2 | 7/2005 | Honkura et al. |
| 6,992,553 | B2 * | 1/2006 | Masuzawa et al. .......... 335/284 |
| 2003/0160674 | A1 | 8/2003 | Komuro et al. |
| 2006/0062683 | A1 * | 3/2006 | Ugai et al. .................... 419/38 |
| 2006/0099404 | A1 * | 5/2006 | Yoshimura et al. .......... 428/323 |
| 2006/0113857 | A1 | 6/2006 | Honkura et al. |

FOREIGN PATENT DOCUMENTS

| | | |
|---|---|---|
| EP | 1 263 116 A2 | 12/2002 |
| JP | 62-140877 | 9/1987 |
| JP | 6-86484 | 3/1994 |
| JP | 06-124822 | 5/1994 |
| JP | 10-22153 | 1/1998 |
| JP | 10-177928 | 6/1998 |
| JP | 2001-037197 | 2/2001 |
| JP | 2003-009438 | 1/2003 |
| JP | 2003-203818 | 7/2003 |
| JP | 2003-204642 | 7/2003 |
| JP | 2004-23085 | 1/2004 |
| JP | 2004-56835 | 2/2004 |
| JP | 2004-111944 | 4/2004 |
| WO | 01/43259 A1 | 6/2001 |

OTHER PUBLICATIONS

Japanese Office Action dated Jun. 12, 2007, with partial English translation.
Chinese Office Action with verified English translation dated May 9, 2008.
Office Action dated Jul. 3, 2008 from U.S. Appl. No. 10/545,428.
Office Action dated Jun. 8, 2007 from U.S. Appl. No. 10/545,428.
Office Action dated Dec. 15, 2008 from U.S. Appl. No. 10/545,428.

* cited by examiner

A-A' Cross-sectional Diagram

ANISOTROPIC BONDED MAGNET FOR USE IN A 4-POLE MOTOR, A MOTOR EMPLOYING THAT MAGNET, AND AN ALIGNMENT PROCESS APPARATUS FOR THE ANISOTROPIC BONDED MAGNET FOR USE IN A 4-POLE MOTOR

The present Application is a Divisional Application of U.S. patent application Ser. No. 10/560,435, filed on Dec. 14, 2005, now U.S. Pat. No. 7,592,889 which claimed priority JPA Nos. 2004-124876 and 2004-124877, filed on Apr. 20, 2004, the entire contents of which is incorporated herein by reference.

TITLE OF THE INVENTION

An anisotropic bonded magnet for use in a 4-pole motor, a motor employing that magnet, and an alignment process apparatus for the anisotropic bonded magnet for use in a 4-pole motor.

1. Field of the Invention

The present invention is related to a hollow cylindrical 4-pole anisotropic bonded magnet, a motor employing that magnet, and an alignment process apparatus used to manufacture the hollow cylindrical 4-pole anisotropic bonded magnet used in that motor.

2. Background Art

Anisotropic bonded magnets molded in the shape of a hollow cylinder are known as permanent magnets for use in motors. By molding this bonded magnet in a state in which a predetermined magnetic field distribution is generated, an axis of easy magnetization for the magnet powder is aligned. For the orientation pattern in a cross-section perpendicular to the axis of cylindrical bonded magnets, primarily, there is axial alignment, radial alignment, and polar alignment. Axial alignment is a method in which in a cross section the magnet is magnetized in a uniaxial direction, and radial alignment is a method in which the magnet is magnetized in a radial pattern emanating outward from the cross-sectional center, that is, in the normalized direction of the circumference.

Also, anisotropic bonded magnets molded in the shape of a hollow cylinder are known as permanent magnets for use in motors. By molding this bonded magnet in a state in which a predetermined magnetic field distribution is generated, an axis of easy magnetization for the magnet powder is aligned. For the orientation pattern in a cross-section perpendicular to the axis of cylindrical bonded magnets, primarily, there is axial alignment, radial alignment, and polar alignment. Axial alignment is a method in which the magnet is magnetized in a uniaxial direction of a cross-section, and radial alignment is a method in which the magnet is magnetized in a radial pattern emanating outward from the cross-sectional center, that is, in the normalized direction of the circumference.

SUMMARY OF THE INVENTION

Problem the Invention Intends to Solve

In recent years, there have been demands for drastic reductions in the size and weight of motors. For example, there are axially aligned 2-pole ring magnets molded with a non-magnetic die, but because there is the problem of low torque, these magnets can not answer the demands for drastic reductions in the size and weight of motors. Also, there are 2-pole ring magnets (for example, patent document 1 mentioned below) which, by embedding magnetic material in a non-magnetic die devised as a developed form of axial alignment, are formed of a 2-pole radially aligned part and a part thought to be axially aligned between the magnetic poles or of an unaligned isotropic part, but because these also have the problem of low torque, they can not answer the demands for drastic reduction in size and weight of motors.

In recent years, in order to answer the demands for drastic reductions in the size and weight of 1-300 W class DC brush motors, investigations have been conducted of 4-pole motors using anisotropic bonded magnets with more than 14 MGOe (for example, Japanese patent 3480733). 4-pole radially aligned magnets are assumed as the magnets used therein. The thickness of the magnets used in these motors is 0.7 to 2.5 mm. In this case, the requirement of increased torque versus 2-pole motors can be satisfied, but there is the problem of high cogging torque. The reason for high cogging torque in this instance is that in the entire periphery alignment is only in the radial direction, and when that magnet is magnetized with 4 poles there is a sudden reduction in surface magnetic flux density between the poles. In order to reduce cogging torque, it is necessary to provide an aligning magnetic field and magnetizing magnetic field which gradually increases and decreases between the magnetic poles (the direction of the magnetic pole reverses in this part, and is therefore referred to below as the "transition region") with changes in the mechanical angle. When the internal magnetization in the transition region in distributed such that changes in the mechanical angle are accompanied by gradual increases and decreases, it is possible to prevent the sudden reduction of surface magnetic flux density in the transition region. Because the coercivity of this anisotropic bonded magnet is high, an aligning magnetic field greater than 0.5 T is necessary. However, it is difficult to provide a 0.5 T magnetic field for a transition region in which the aligning magnetic field becomes small with the above aligning methods.

So, for a 4-pole magnet used in a 4-pole motor, we extend a procedure devised as a developed form axial alignment for a 2-pole magnet used in a 2-pole motor (patent document 1) to making the magnet and motor have 4-poles. In a 4-pole motor, because the gap which can be used for the aligning yoke of the aligning die is small in comparison to that for 2-pole alignment, there is the problem that it is difficult to provide a sufficient aligning magnetic field in the transition region.

Incidentally, the material of the dice ring which is one part of the die which forms the outer peripheral surface of the bonded magnet is non-magnetic material, and in order to improve the life span of the die, non-magnetic super-hardened material is frequently used. Even when merely making the dice ring of non-magnetic material and increasing the supplied magnetic field, when fixing the size of the aligning die and apparatus, the maximum supplied magnetic field is determined by the size of the yoke, and a magnetic field greater than a particular value can not be provided. Results of investigating adjustment of the distance in the circumferential direction between yokes are as described below.

When attempting to increase the angle range of the region which is radially aligned, because the angular width between each yoke naturally increases, the distance in the circumferential direction between yokes of the magnetic body is too small, and short-circuiting of the magnetic flux occurs between yoke poles. As a result, an effective magnetic field is not generated in the transition region of the cavity. Therefore, the size of the aligning magnetic field in the transition region decreases. And, in order to reduce the magnetic field of the transition region which leaks out of the cavity, that is, short-circuiting between the yoke poles, it is thought to keep the dice ring contacting the internal peripheral surface of the yoke at a distance in the radial direction and increase the distance in the circumferential direction between the poles of each yoke. However, because the distance from the magnetic pole of each yoke to the cavity is increased, there is the problem that the radial alignment magnetic flux generated in the cavity is naturally reduced. Also, when reducing the yoke angle width to avoid the leakage (short-circuiting) of magnetic flux between yoke poles, without receding the opposing surface of the yoke cavity in the radial direction, the area of the aligned part in the region of the cavity which the aligning yoke faces is decreased, despite a sufficient aligning magnetic field being provided. Therefore, the aligning magnetic field of the transition region decreases due to the distance between yoke poles being too great, and in the bonded magnet unaligned isotropic dead space is generated in the transition region. Torque therefore is reduced. Thus, it is not possible to obtain magnet which satisfies high torque and low cogging torque.

When a bonded magnet with this sort of alignment is used in, for example, a 2-pole brush motor, the motor mainly shows the following properties. In a motor using a axially aligned bonded magnet, the surface magnetic flux density in the normalized direction changes sinusoidally with changes in mechanical angle, and therefore cogging torque is low, but output torque is also low. On the other hand, in a motor using a radially aligned bonded magnet, the surface magnetic flux density in the normalized direction changes squarely with changes in mechanical angle, and therefore both output torque and cogging torque are high.

Patent document 1 below discloses a 2-pole magnet axially aligned in the transition region between magnetic poles. However, in the case of forming a 4-pole bonded magnet, the actual angle between transition regions is small as described above, and orientation in the transition regions is actually difficult. So the idea of gradually changing the alignment direction of anisotropic rare earth magnet powder between transition regions is not disclosed, and this sort of alignment is not possible using the described die structure.

Patent documents 2 and 3 below disclose bonded magnets having the property that, in the transition region between magnetic poles, the components of the normalized direction of surface magnetic flux density after magnetization are gradually increase and decrease with changes in mechanical angle. However, even when this magnetization distribution is realized, although cogging torque is reduced in comparison to the case of radial alignment, motor output is small.

Figure 11:
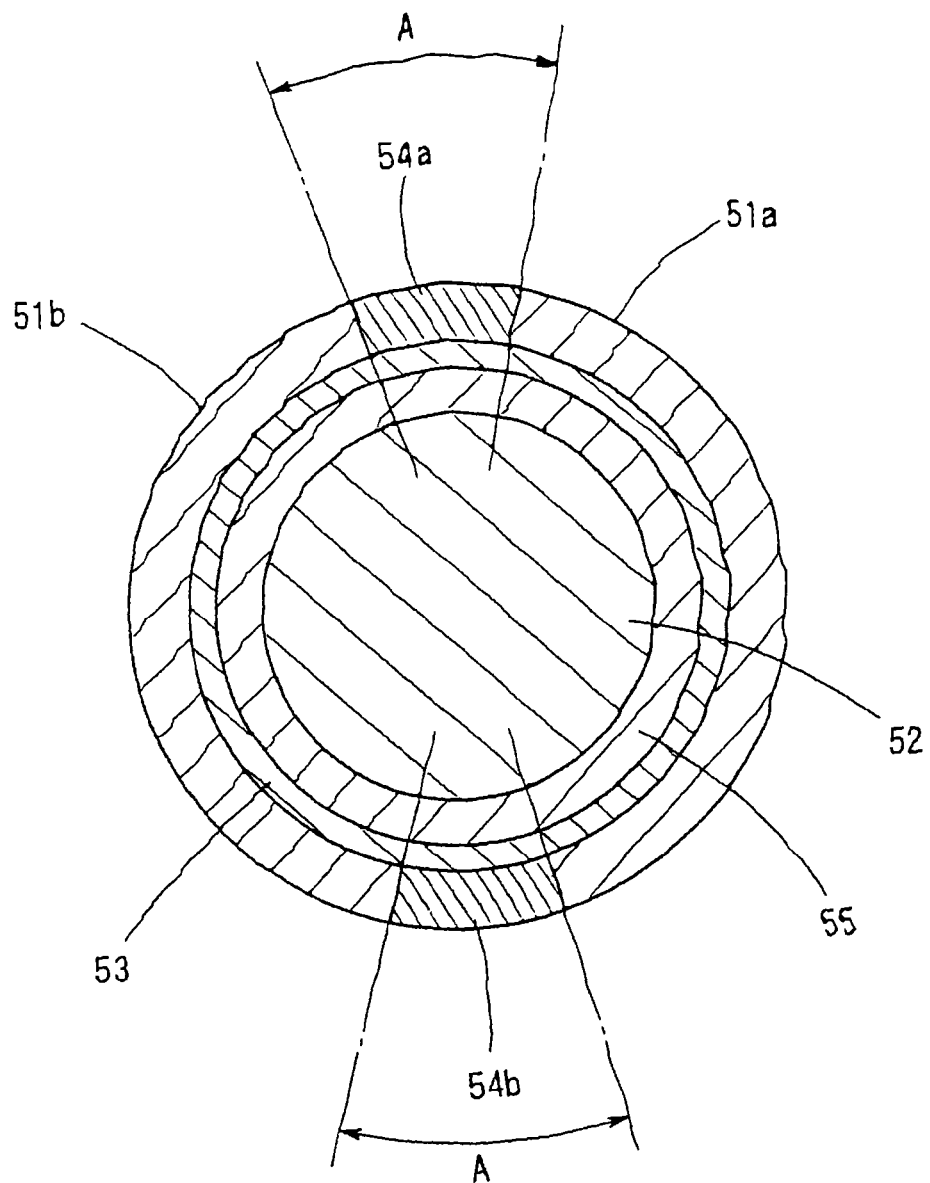

As shown in FIG. 11, according to patent documents 2 and 3, the die has guides 51a and 51b, which are soft magnetic bodies, comprised of core 52 which is a soft magnetic body, cavity 55, and ring 53 which is a non-magnetic body; and inserts 54a and 54b comprised of non-magnetic bodies. In this molding die, ring 53 comprised of a non-magnetic body of super-hard material is used in order to resist wear due to molding pressure on the outside of cavity 55. Therefore, in transition region A, the magnetic path of the external normalized direction of cavity 55 is formed of ring 53 which is a non-magnetic body, and inserts 54a and 54b which are non-magnetic bodies. Because these are all non-magnetic bodies, in transition region A, a magnetic field distribution is not possible in which the magnetic field distribution steadily points towards a direction tangential to the periphery of the cylindrical side at points closer to the neutral point of the magnetic pole, and becomes a direction tangential to the periphery of the cylindrical side at that neutral point, and steadily points toward the normalized direction of the cylindrical side at points farther away from the neutral point. And in the case of using anisotropic rare-earth magnet powder, a large magnetic field is necessary for alignment. Due to these things, in patent documents 2 and 3, the aligning magnetic field components of the circumferential direction in transition region A are not large, to the extent that alignment is sufficiently completed. Therefore, in transition region A, alignment is not complete, becoming isotopic alignment. This causes motor output to be less than in the case of using a radially aligned anisotropic bonded magnet.

This time, recognizing the advantages of the molding die, an investigation of the alignment method was performed. In the above conventional technology, non-magnetic material is used for all parts of the magnet external diameter die for the transition region, and non-magnetic super-hard material was frequently used with the objective of improving the lifespan of the die. Making non-magnetic material the material for the magnet external diameter die for the transition region means that alignment can not be performed between cavity transition regions.

When simply replacing the material of the magnet external diameter die of the transition region with magnetic material such as iron which has a completely opposite function, because it is thought that magnetic flux flows through this magnetic member, it did not come to be used in the conventional technology.

So, as a result of thorough investigation, by making the magnet external diameter die between transition regions of magnetic material, and moreover, using material with strength for the die material and making it as thin as possible, magnetic saturation of this magnetic material is actively carried out, and in comparison to the case of using non-magnetic material, in the case of the same cavity, because it is possible to simultaneously shorten air gaps in the magnetic circuit, it is possible to greatly improve the magnetic field supplied to the same cavity. As a result of that, in the transition region, it is possible to provide an aligning field that gradually increases and decreases with changes in mechanical angle.

Moreover, when magnetizing according to the same magnetization pattern, it is possible to distribute the internal magnetization between transition regions so that it gradually increases and decreases with changes in mechanical angle, and the conventional dead space between transition regions can effectively be made to function. Therefore, because the surface magnetic flux density between transition regions is formed so as to gradually increase and decrease with changes in mechanical angle, it is possible to prevent a sudden drop in surface magnetic flux, and cogging torque can be greatly reduced while preserving cogging torque.

Thus, it is an object of the present invention to realize a small motor bonded magnet with high output torque and low cogging torque.

[Patent Document 1]
Japanese Unexamined Patent Application (Kokai) 6-86484

[Patent Document 2]
Japanese Unexamined Patent Application (Kokai) 2004-23085

[Patent Document 3]
Japanese Unexamined Patent Application (Kokai) 2004-56835

The structure of the invention for solving the problems described above, as cited in claim 1, is a 4-pole motor anisotropic bonded magnet characterized in that the said magnet has a hollow cylindrical shape and a maximum energy product greater than 14 MGOe, formed by molding anisotropic rare-earth magnet powder with resin, wherein the alignment distribution of the anisotropic rare-earth magnet powder in a cross section perpendicular to the axis of the anisotropic bonded magnet is in the normalized direction of the cylindrical side of the hollow cylindrical shape in the main region of a polar period, and in a transition region in which the direction of the magnetic pole changes, steadily points towards a direction tangential to the periphery of the cylindrical side at points closer to the neutral point of the magnetic pole, and becomes a direction tangential to the periphery of the cylindrical side at that neutral point, and steadily points toward the normalized direction of the cylindrical side at points farther away from the neutral point, and wherein the 4-pole motor anisotropic bonded magnet in which the said alignment distribution is obtained is magnetized in an alignment direction.

The invention cited in claim 2 is a 4-pole motor anisotropic bonded magnet according to claim 1, characterized in that orientation of the anisotropic rare-earth magnet powder between transition regions is performed with an aligning magnetic field of greater that 0.5 T.

A magnetic field of greater than 0.5 T is necessary to sufficiently align anisotropic rare-earth magnet powder in resin. Particularly, if there is not magnetic field greater than 0.5T in the case of Nd-Fe-B anisotropic magnet powder, which is difficult to align, 95% degree of alignment can not be obtained. And, in the case of Nd-Fe-B anisotropic rare-earth magnet powder, a magnetic field greater than 0.70 T is necessary to complete sufficient alignment of greater than 97%, and a magnetic field greater than 0.8 T is desirable. Accordingly, it is desirable to make the magnetic field between transition regions in the cavity greater than 0.5 T. This degree of orientation was found from the percentage of surface magnetic flux Br obtained when applying a 4.0 T magnetizing magnetic field after applying a particular aligning magnetic field relative to surface magnetic flux $Br_{max}$ obtained when applying a 4.0 T magnetizing magnetic field after applying a 1.5 T aligning magnetic field to a work piece of the same shape. The location of measurement for the aligning magnetic field in the cavity is the position shown in FIG. 8 (stated later).

The invention cited in claim 3 is for the 4-pole motor anisotropic bonded magnet according to claim 1 or claim 2, characterized in that for the surface magnetic flux density distribution in the normalized direction of the main polar period after magnetization of the anisotropic bonded magnet, the ratio of the difference between the maximum value and minimum value to the average value in this main region is 0.2 or less.

The invention cited in claim 4 is for a motor having the 4-pole motor anisotropic bonded magnet according to any one of claims 1 through 3.

The anisotropic rare-earth bonded magnet of the present invention is made according to the production process proposed by the applicant in Japanese Unexamined Patent Application (Kokai) p2001-76917A, Registration Number 2816668. This magnet is manufactured, for example, by resin molding magnet powder comprised of Nd-Fe-B, and is strongly magnetized in a uniaxial direction. This magnet is characterized in that it has a maximum energy product (BHmax) that is more than four times that of conventional sintered ferrite magnets.

And, because this anisotropic rare-earth bonded magnet is formed by resin molding, it is easily and precisely formed. Thus, it is possible to make the shape of the permanent magnet in the internal periphery of the motor case into a hollow cyclinder with good precision. That is, the magnetic field inside the motor due to the permanent magnet can be made to have precise revolving symmetry. Because the symmetry of the internal magnetic field has high precision, the electromagnetic revolving body in the center can rotate receiving uniform torque. Thus noise due to conventional torque unevenness is reduced, making a quieter motor apparatus. Also, because the anisotropic rare-earth bonded magnet is resin molded in the shape of a hollow cylinder, it is easily installed into the motor apparatus case. It is not necessary to install separate 4-pole sintered ferrite magnets as in the conventional technology. That is, it has the advantage of a simplified production process.

The present invention has special characteristics in the distribution of the alignment direction (direction of the easily-magnetized axis after rotating the anisotropic rare-earth magnet powder such that the easily magnetized axis of the anisotropic rare-earth magnet powder direction of the aligning magnetic field is provided to the outside) of the anisotropic rare-earth magnet powder in a cross-section perpendicular to the axis of the hollow cylindrical 4-pole anisotropic bonded magnet. That is, when expressing the periodic change of the magnetic poles as variable of mechanical angle, in the region of mechanical angles which chiefly contribute generation of torque, in the cross section, the alignment direction of the anisotropic rare-earth magnet powder is in the normalized direction. And, in the transition region in which the direction of the magnetic poles changes, as shown in FIG. 1, the alignment direction of anisotropic rare-earth magnet powder points in a direction tangential to the periphery of the cylindrical side at locations gradually closer to the neutral point M of the magnetic poles, and points in a direction tangential to the periphery at that neutral point M, and points in the normalized direction of the cylindrical side at locations gradually further from the neutral point M.

In the 4-pole anisotropic bonded magnet of the present invention, the alignment direction of the anisotropic rare-earth magnet powder is made to have this kind of distribution, and moreover, the magnet is magnetized in an alignment direction, obtaining a large magnetic moment. And, after this magnetization the surface magnetization vectors of the 4-pole anisotropic bonded magnet resemble the alignment distribution, differing only in size. Also, it is desirable for the anisotropic bonded magnet to have a maximum energy product of more than 14 MGOe. More preferably it will be greater than 17 MGOe. When the maximum energy product exceeds these values, it is possible to make great use of the advantages of the alignment distribution of the present invention, and along with effectively increasing motor output it is also possible to reduce cogging torque.

The structure of the invention cited in claim 5 for solving the above mentioned problems is an alignment processing apparatus comprising, in an alignment processing apparatus for manufacturing, by molding using a die, a hollow cylindrical-shaped anisotropic bonded magnet for use in a 4-pole motor, the magnet being formed by molding anisotropic rare-earth magnet powder with resin, a core comprising a column-shaped magnetic body provided in a die molding space;

a cavity of width 0.7 to 3 mm for filling with the anisotropic bonded magnet raw material and molding the magnet, the cavity being formed in a cylindrical shape on the outer periphery of the core;

No.1 one dice, comprising of a magnetic body divided into quarters forming an aligning magnetic field in the normalized direction of the cavity, disposed on the outer periphery of the core and facing the center of the core;

No.2 two dice divided into quarters, comprising a non-magnetic body disposed on the outer periphery of the core and facing the center of the core, and, corresponding to the transition region in which the direction of the magnetic poles of the bonded magnet changes, located between the adjacent No.1 dice;

coils conferring magnetic flux on the four No.1 dice; and a magnetic flux induction member comprising a thin-walled cylindrical magnetic body which forms the outer peripheral surface of the cavity.

In the above mentioned core it is possible to use ferromagnetic soft iron, such as pure iron and SS400; in the No.1 dice it is possible to use ferromagnetic bodies such as pure iron and SS400; in the magnetic flux induction member it is possible to use ferromagnetic bodies such as magnetic cemented carbides, powder high-speed steel, and high-speed steel material; and in the No.2 dice it is possible to use non-magnetic bodies such as SUS304 and precipitation hardening stainless steel.

The invention cited in claim 6 is the alignment process apparatus according to claim 5, characterized in that the thickness of the magnetic flux induction member is 1.0 to 3.5 mm.

The invention cited in claim 7 is the alignment process apparatus according to claim 5 or 6, characterized in that the magnetic flux inducement member is comprised of super-hard material.

The invention cited in claim 8 is the alignment process apparatus according to any of claims 5 through 7, characterized in that the aligning magnetic field of the region of the cavity in which the No. 2 dice are present induces magnetic flux greater than 0.5 T.

The invention cited in claim 9 is the alignment process apparatus according to any one of claims 5 through 8, characterized in that it possesses a ring comprising cylindrical thin-wall magnetic super-hard material which forms the inner surface of the cavity, disposed on the outer periphery of the core.

EFFECT OF THE INVENTION

Figure 2:
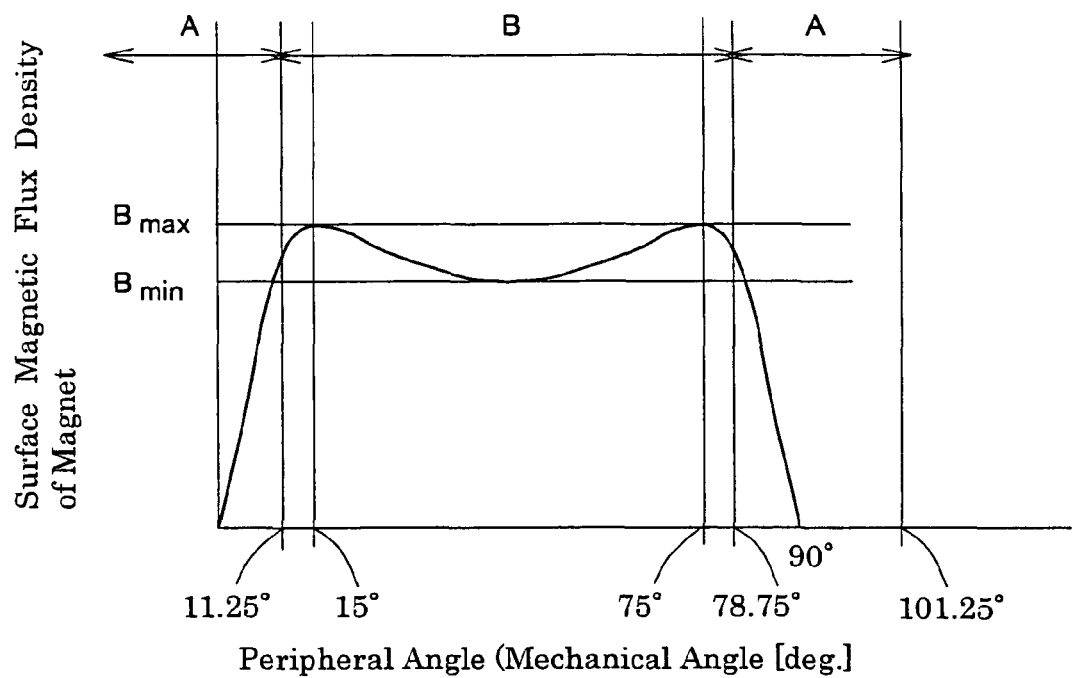

The alignment distribution of the anisotropic rare-earth magnet powder is as shown in FIG. 1. The distribution of surface magnetization vectors is as shown in FIG. 2. Because the alignment direction of anisotropic rare-earth magnet powder in the transition region is such that the alignment direction of anisotropic rare-earth magnet powder points in a direction tangential to the periphery of the cylindrical side at locations gradually closer to the neutral point M of the magnetic poles, and points in a direction tangential to the periphery at that neutral point M, and points in the normalized direction of the cylindrical side at locations gradually further from the neutral point M, when afterwards magnetizing, it is possible to increase the size of the magnetization vectors in this transition region. As a result, motor output torque can be increased the same as in the case of radial alignment, and it is possible to decrease cogging torque in comparison to radial alignment.

And, a magnetic field in a normalized direction can be formed in the cavity by the No. 1 dice and core which are magnetic bodies divided into quarters. In the transition region in which the direction of the magnetic poles changes, because the No. 2 dice, which are non-magnetic bodies, are present, it is difficult to form a magnetic field in the normalized direction. Because a cylindrical magnetic flux induction member comprising a magnetic body is provided which forms the outer periphery of the cavity, a part of the magnetic flux induced in the normalized direction of the cavity by the No. 1 dice located on both sides of the No. 2 dice is also induced in the circumferential direction of the transition region. This magnetic flux induced in the circumferential direction of the transition region leaks into the transition region of the cavity.

Therefore, in the transition region of the cavity, a magnetic field is generated possessing components of the circumferential direction. The result of this is that in the transition region of the cavity, it is possible for the alignment direction of anisotropic rare-earth magnet powder to point in a direction tangential to the periphery of the cylindrical side at locations gradually closer to the neutral point of the magnetic poles, and to point in a direction tangential to the periphery at that neutral point, and to point in the normalized direction of the cylindrical side at locations gradually further from the neutral point. And, in the regions which mainly generate torque other than the transition region of the cavity, it is possible to make the normalized direction be the alignment direction of the anisotropic rare-earth magnet powder.

When anisotropic rare-earth magnet powder is made into a bonded magnet and magnetized with this sort of semi-radial alignment, and used as a 4-pole magnet in a motor, it will be a motor with high output and low cogging torque. The manufacturing apparatus of the present invention can easily manufacture a 4-pole anisotropic rare-earth bonded magnet having this sort of alignment.

SIMPLE EXPLANATION OF THE DRAWINGS

[FIG. 1]

A cross-sectional diagram showing the alignment distribution of anisotropic rare-earth magnet powder in a bonded magnet having to do with a specific embodiment of the present invention, and moreover manufactured by an alignment process apparatus having to do with a specific embodiment of the present invention.

[FIG. 2]

A properties diagram showing the relationship between the surface magnetic flux density of a bonded magnet having to do with the present invention and circumferential angle.

[FIG. 3]

A properties diagram showing the relationship between a semi-radially aligned bonded magnet having to do with an embodiment of the present invention and surface magnetic flux density in the normalized direction of a radially aligned bonded magnet, and between orientation and magnetization vectors.

[FIG. 4]

A lateral cross-sectional diagram of the alignment processing apparatus of a bonded magnet having to do with an embodiment of the present invention.

[FIG. 5]

A vertical cross-sectional diagram of the alignment processing apparatus of a bonded magnet having to do with an embodiment of the present invention.

[FIG. 6]

A lateral cross-sectional diagram showing the detailed structure of the inside of the die of the same alignment processing apparatus.

[FIG. 7]

An explanatory diagram for explaining the alignment distribution having to do with an embodiment of the present invention.

[FIG. 8]

An explanatory figure showing the measurement point of the aligning magnetic field within the cavity in the die.

[FIG. 9]

A properties diagram showing the size properties of the aligning magnetic field of the present invention, along with the alignment properties of a conventional example.

[FIG. 10]

A properties diagram showing the relationship between torque of a motor using the bonded magnet of the present invention and revolutions, along with a conventional example.

[FIG. 11]

A cross-sectional diagram perpendicular to the axis of a bonded magnet of an alignment apparatus according to a conventional example.

PARTS NAMES

10 ... anisotropic bonded magnet
11 ... axis
12 ... external wall
30 ... die
32 ... core
34 ... No. 1 ring
35 ... cavity
36 ... No. 2 ring
38a, 38b, 38c, 38d ... No. 1 dice
40a, 40b, 40c, 40d ... No. 2 dice
44a, 44b, 44c, 44d ... spaces
46a, 46b, 46c, 46d ... coils
51a, 51b ... guides
55 ... cavity

DETAILED DESCRIPTION OF THE PREFERRED EMBODIMENTS

The present invention is explained below based on embodiments, but the present invention is in no way limited to the embodiments explained below.

The anisotropic rare-earth bonded magnet is made according to the production process proposed by the applicant in Japanese Unexamined Patent Application (Kokai) p2001-76917A, Registration Number 2816668. This magnet is manufactured, for example, by resin molding magnet powder comprised of Nd-Fe-B, and is strongly magnetized in a uniaxial direction. This magnet is characterized in that it has a maximum energy product ($BH_{max}$) that is more than four times that of conventional sintered ferrite magnets.

And, because this anisotropic rare-earth bonded magnet is formed by resin molding, it is easily and precisely formed. Thus, it is possible to make the shape of the permanent magnet in the internal periphery of the motor case into a hollow cylinder with good precision. That is, the magnetic field inside the motor due to the permanent magnet can be made to have precise revolving symmetry. Because the symmetry of the internal magnetic field has high precision, the electromagnetic revolving body in the center can rotate receiving uniform torque. Thus noise due to conventional torque unevenness is reduced, making a quieter motor apparatus. Also, because the anisotropic rare-earth bonded magnet is resin molded in the shape of a hollow cylinder, it is easily installed into the motor apparatus case. It is not necessary to install separate 4-pole sintered ferrite magnets as in the conventional technology. That is, it has the advantage of a simplified production process.

The present invention has special characteristics in the distribution of the alignment direction (direction of the easily-magnetized axis after rotating the anisotropic rare-earth magnet powder such that the easily magnetized axis of the anisotropic rare-earth magnet powder direction of the aligning magnetic field is provided to the outside) of the anisotropic rare-earth magnet powder in a cross-section perpendicular to the axis of the hollow cylindrical 4-pole anisotropic bonded magnet. That is, when expressing the periodic change of the magnetic poles as variable of mechanical angle, in the region of mechanical angles which chiefly contribute generation of torque, in the cross section, the alignment direction of the anisotropic rare-earth magnet powder is in the normalized direction. And, in the transition region in which the direction of the magnetic poles changes, as shown in FIG. 1, the alignment direction of anisotropic rare-earth magnet powder points in a direction tangential to the periphery of the cylindrical side at locations gradually closer to the neutral point M of the magnetic poles, and points in a direction tangential to the periphery at that neutral point M, and points in the normalized direction of the cylindrical side at locations gradually further from the neutral point M.

In a 4-pole anisotropic bonded magnet in which the alignment direction of anisotropic rare-earth magnet powder is made to have this sort of distribution, by further magnetizing in the alignment direction, a 4-pole anisotropic bonded magnet can be obtained which has a large magnetic moment with a magnetization distribution the same as the alignment distribution. The distribution of surface magnetization vectors in this 4-pole anisotropic bonded magnet after magnetization is similar to the alignment distribution, differing only in size. Also, it is desirable for the anisotropic bonded magnet to have a maximum energy product of more than 14 MGOe. More preferably it will be greater than 17MGOe. When the maximum energy product exceeds these values, it is possible to make great use of the advantages of the alignment distribution of the present invention, and along with effectively increasing motor output it is also possible to reduce cogging torque.

Embodiment 1

FIG. 1 shows the structure of a bonded magnet having to do with a specific embodiment of the present invention. In bonded magnet 10, by way of example, an Nd-Fe-B anisotropic rare-earth bonded magnet is used. Bonded magnet 10 has a hollow cylindrical shape including external wall 12 formed around the periphery with axis 11 as the center. FIG. 1 is a lateral cross-sectional diagram perpendicular to axis 11.

FIG. 1 shows the alignment direction of anisotropic rare-earth magnet powder in exterior wall 12. Region B at a mechanical angle (actual rotation angle) of about 67.5 degrees is the region which primarily generates torque. And, region B at a mechanical angle of about 22.5 degrees is the transition region in which magnetic poles change. However, the transition region means the region which is the provisional measure of where magnetic pole direction begins to change from the normalized direction to the direction tangent to the periphery, and the components of the peripheral tangent do not critically exchange at this border. In region B, the anisotropic rare-earth magnet powder is aligned in the normalized direction of the cylindrical side. In transition region A, as shown in the figure, the alignment direction of the anisotropic rare-earth magnet powder gradually reverses with changes mechanical angle. That is, the alignment direction of anisotropic rare-earth magnet powder points in a direction tangential to the periphery of the cylindrical side at locations gradually closer to the neutral point of the magnetic poles, and points in a direction tangential to the periphery at that neutral point M, and points in the normalized direction of the cylindrical side at locations gradually further from the neutral point M.

An aligning magnet field for orienting the magnet powder is applied, and after press molding, the 4-pole anisotropic bonded magnet is magnetized. Shown in FIG. 2 are the properties for change in surface magnetic flux density in the normalized direction after magnetizing in a range of a mechanical angle of 90 degrees. As shown in FIG. 2, in region B, the surface magnetic flux density in the normalized direction is roughly fixed, and in transition region A the absolute value of surface magnetic flux density in the normalized direction gradually increases and decreases along with increases in mechanical angle θ.

Surface magnetic flux density of bonded magnet 10 in the normalized direction in the cross sectional diagram parallel to axis 11 is uniform along the direction of axis 11. However, the magnet does not have to be uniformly magnetized along the direction of axis 11.

Figure 3:
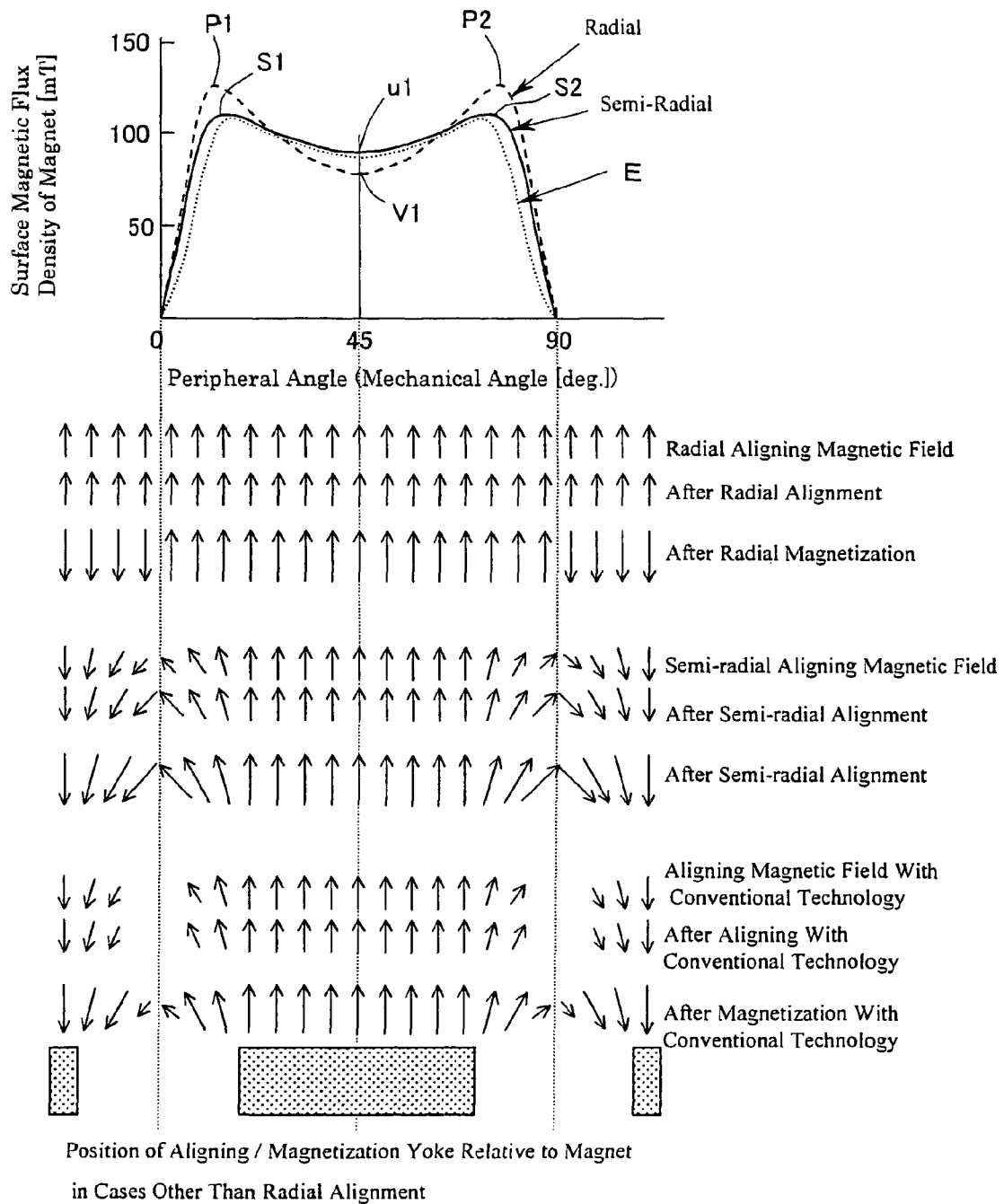
Figure 7:
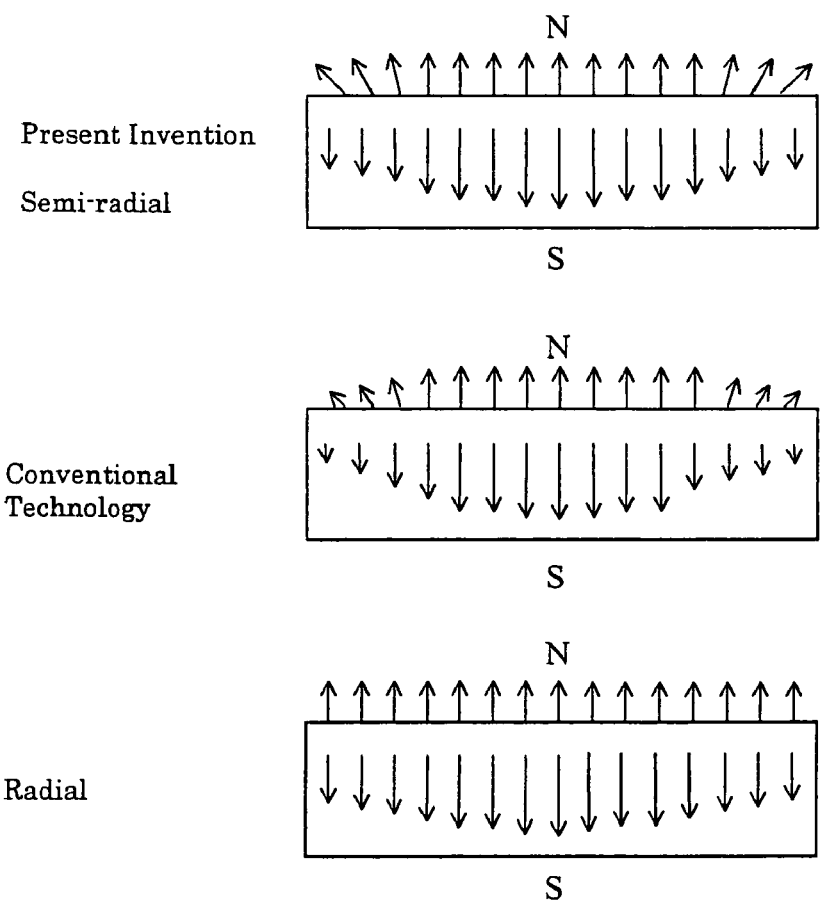

On the other hand, as a comparison example, a radially aligned bonded magnet was produced. Dimensions are the same as the bonded magnet of the above embodiment. Shown in FIG. 3 are the properties for change in surface magnetic flux density in the normalized direction of the bonded magnet radially aligned and magnetized at a mechanical angle of 90 degrees. As shown in FIG. 3, the radially aligned bonded magnet has the properties that rise and fall of surface magnetic flux density in transition region A is sudden, peak P1 in the vicinity of rise and peak P2 in the vicinity of fall appear, and there is valley V1 in the center (in mechanical angle, π/4) of region B. As shown in FIG. 7, this is thought to be the effect of the largest opposite magnetic field in the center of region B due to finite distribution of the magnetic load (magnetization) appearing on the surface of the anisotropic bonded magnet.

Incidentally, in the case of the semi-radial alignment of the present invention, in transition region A the rise and fall of surface magnetic flux density is smooth in comparison to the case of a radially magnetized bonded magnet, peaks S1 in the vicinity of rise and S2 in the vicinity of fall are small in comparison the case of radial alignment, and valley U1 in the center (in mechanical angle, π/4) of region B is large in comparison to the case of radial alignment. That is, it is understood that the difference between a peak and valley (S1-U1) in the case of the semi-radial alignment of the present invention is smaller than the difference between a peak and a valley (P1-V1) in the case of radial alignment. Also, when defining ripple rate as the ratio of the difference in peak and valley to the average value $B_{max}$ of surface magnetic flux density shown in FIG. 3 in the range of mechanical angle π/2, ripple rate is 27% in the case of radial alignment, and 11% in the case of the semi-radial alignment of the present embodiment. In the case of alignment applying the method devised as a developed form of axial alignment in a 2-axis motor to a 4-pole motor, ripple rate is 10.4%.

The average value $B_{max}$ of surface magnetic flux density is, when making that value 100 in the case of radial alignment, 103 in the case of the semi-radial alignment of the present embodiment. In the case of the method proposed as a developed form of axial alignment in 2-pole motors applied to 4-pole motors, that average value is 95. When the ripple rate is large, because the rise and fall in properties is sudden, cogging torque increases. It is desirable to make ripple rate less than 20% as the range in which cogging torque decreases.

On the other hand, the surface magnetic flux density of the anisotropic bonded magnet according to patent documents 2 and 3 in the normalized direction after magnetization has the properties shown by curve E in FIG. 3. Because, as explained in the section on the conventional technology, a sufficient aligning magnetic field is not provided, because the anisotropic magnet powder is not aligned in transition region A, the magnetization vectors are small even after magnetizing, thought to be caused by low surface magnetic flux density in transition region A.

This sort of property in which two peaks appear in the range of mechanical angle π/2 is thought to be an effect of the opposite magnetic field due to the magnetic load (magnetization) appearing on the surface of the anisotropic bonded magnet. In the case where magnetic load (magnetization) is uniformly distributed in the finite range of mechanical angle π/2, because due to the symmetry of the magnetic load (magnetization) the effect of the opposite magnetic field is greatest in the center of the region of mechanical angle π/2, as shown in FIG. 7, magnetic flux density is smallest in that center. In the case of the semi-radial alignment of the present embodiment, because in transition region A the alignment direction of the anisotropic rare-earth magnet powder gradually faces the direction tangential to the periphery as it turns toward the neutral point M, the magnetic load (magnetization) density appearing on the surface of the bonded magnet gradually grows smaller as the alignment direction faces neutral point M. A result of this is that as shown in FIG. 7, it is thought that in comparison to radial alignment, with the semi-radial alignment of the present invention, the opposing magnetic field is small at the extremity and the center of the region of mechanical angle π/2, the peak of both extremities is smaller, and the valley in the center is larger, resulting in a smaller difference the peak and the valley.

Figure 4:
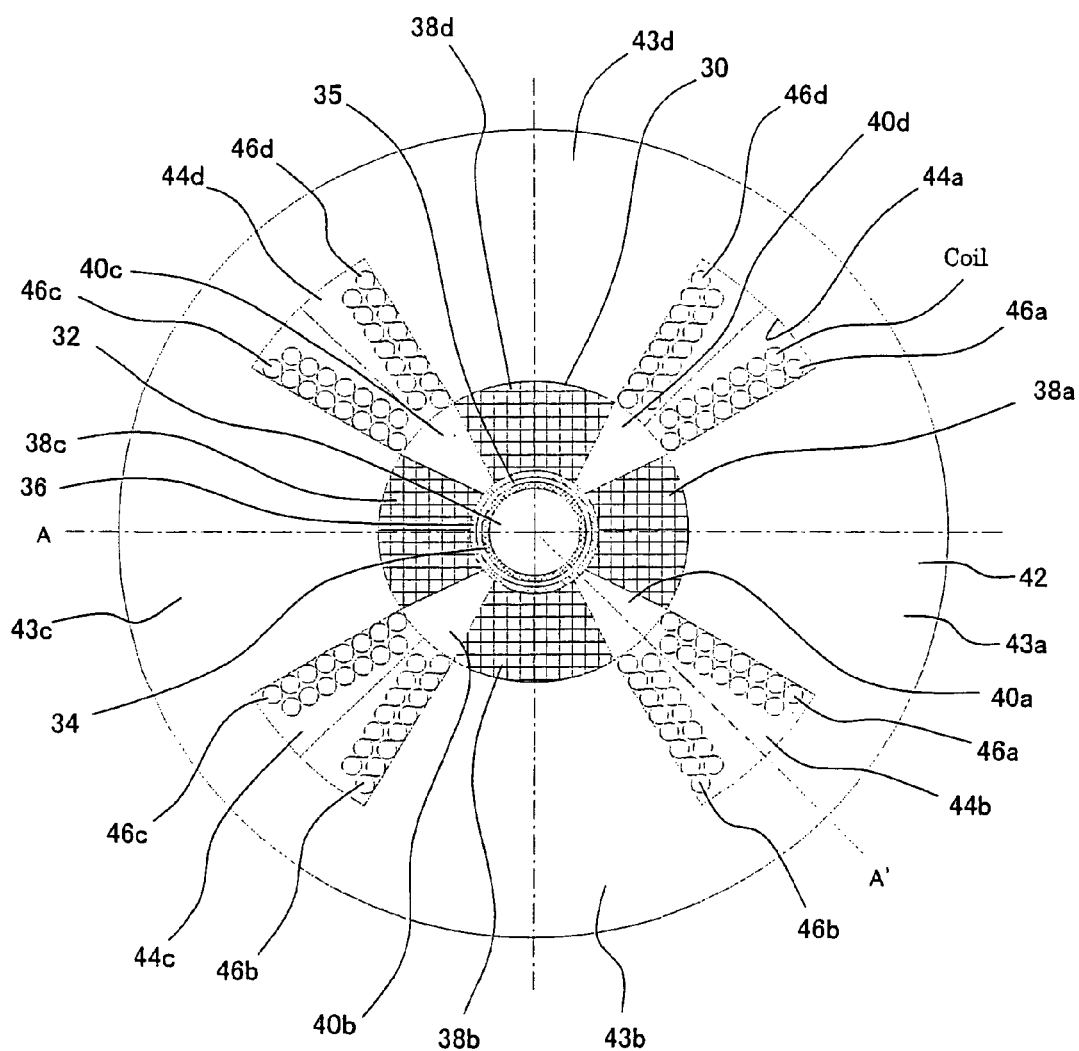
Figure 5:
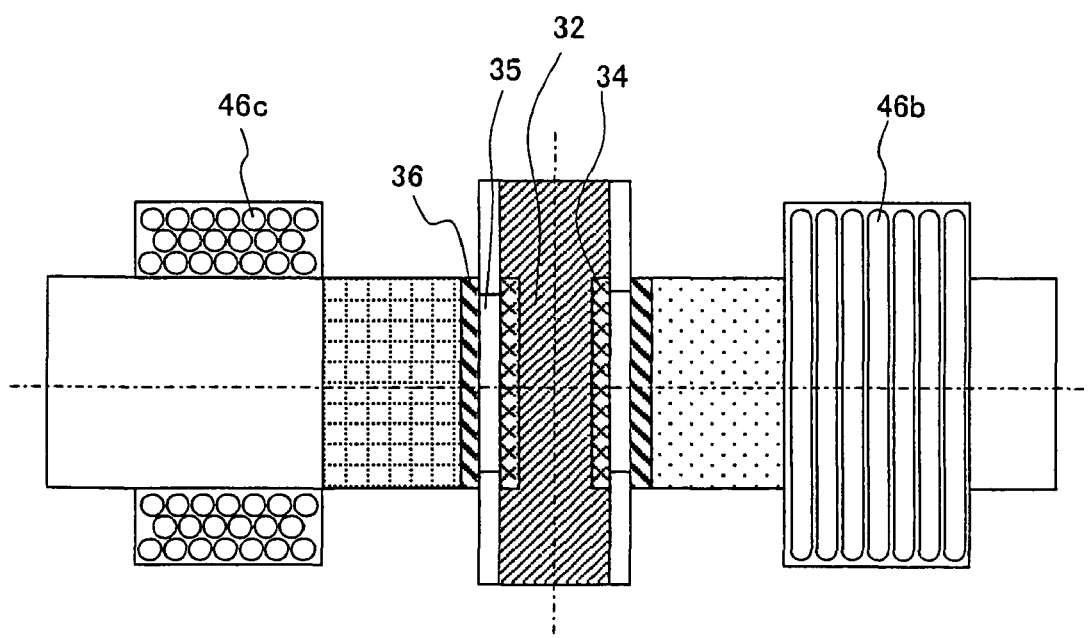
Figure 6:
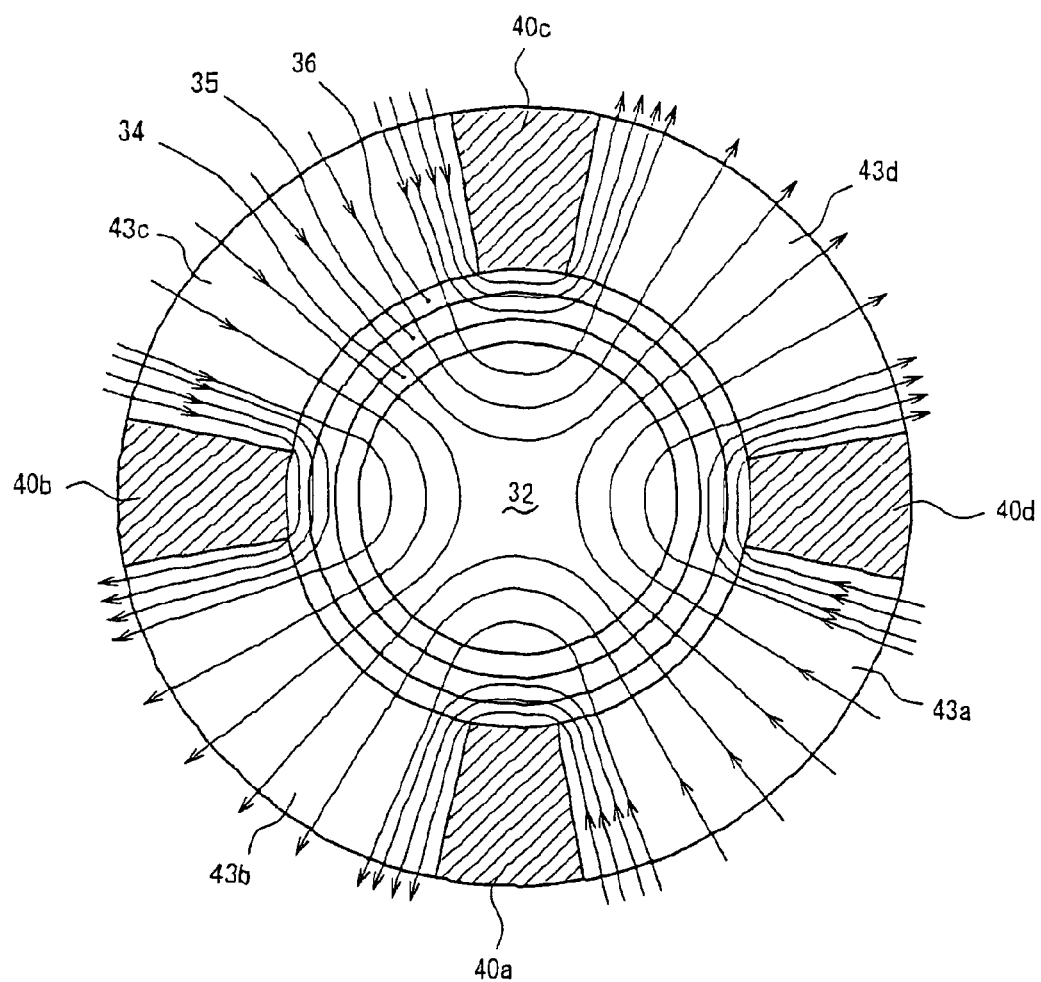

Next, an explanation is made of the above bonded magnet orientation based on an embodiment executed when press molding. Below, the bonded magnet produced by this embodiment in referred to as Type A. FIG. 4 is a plane cross sectional diagram of the apparatus, and FIG. 5 is a vertical cross sectional diagram of the apparatus. FIG. 6 is a detailed cross sectional diagram of the part of die 30 including cavity 35. In cylindrical die 30, core 32 with outer diameter 26 mm and comprised of a soft magnetic body is disposed in the center, and cylindrical No. 1 ring 34 with inner diameter 26 mm, outer diameter 30 mm, and thickness 2 mm, comprised of magnetic super-hard material which is a ferromagnetic body, is disposed around the periphery of that core 32. Also provided is a cylindrical No. 2 ring with inner diameter 33 mm, outer diameter 37 mm, and thickness 2 mm, comprised of magnetic super-hard material which is a ferromagnetic body, forming a fixed gap with No. 1 ring 34. The thickness of No. 2 ring 36 is 2 mm, and saturated magnetic flux density is 0.3T. Between No. 1 ring 34 and No.2 ring 36, cavity 35 with thickness 1.5 mm is formed for the purpose of resin molding. Bonded magnet raw material constituting magnet powder and resin powder is provided in this cavity 35.

On the outside of No. 2 ring 36 are provided No. 1 dice 38a, 38b, 38c, and 38d, comprising fan-shaped ferromagnetic bodies divided into quarters, and No. 2 dice 40a, 40b, 40c, and 40d provided between the No. 1 dice, comprising fan shaped non-magnetic bodies such as stainless steel. Die 30 is formed by these members. The arc length in a cross-section perpendicular to the axis of the joined surfaces of No. 2 ring 36 and No. 1 dice 38a, 38b, 38c, and 38d, comprising fan-shaped ferromagnetic bodies divided into quarters, is about 23 mm. The arc length in a cross-section perpendicular to the axis of the joined surfaces of No. 1 ring 34 and No. 2 dice 40a, 40b, 40c, and 40d, comprising fan-shaped non-magnetic bodies divided into quarters, is about 6 mm.

On the outside of die 30 is provided circular pole piece 42, and that pole piece 42 has 4 divisions 43a, 43b, 43c, and 43d. Spaces 44a 44b, 44c, and 44d are formed in order to wind a coil between each division. In the space between adjoining coils, for example in spaces 44a and 44b, coil 46a is wound such that it includes division 43a between those spaces.

In the above structure, it is possible to generate magnetic flux such that the surface of pole piece 43a becomes an N pole by imparting electric current to coil 46a, to generate magnetic flux such that the surface of pole piece 43b becomes an S pole by imparting electric current to coil 46b, to generate magnetic flux such that the surface of pole piece 43c becomes an N pole by imparting electric current to coil 46c, and to generate magnetic flux such that the surface of pole piece 43d becomes an S pole by imparting electric current to coil 46d.

Figure 8:
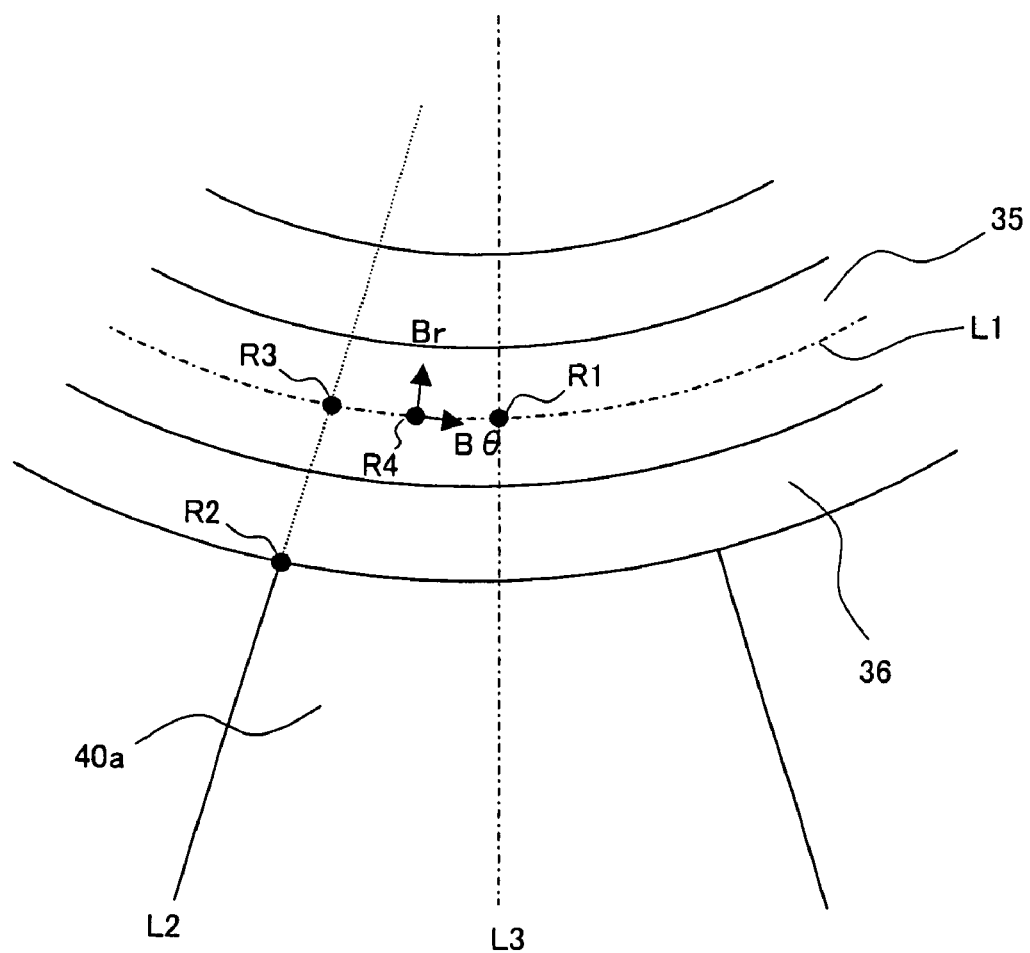
Figure 9:
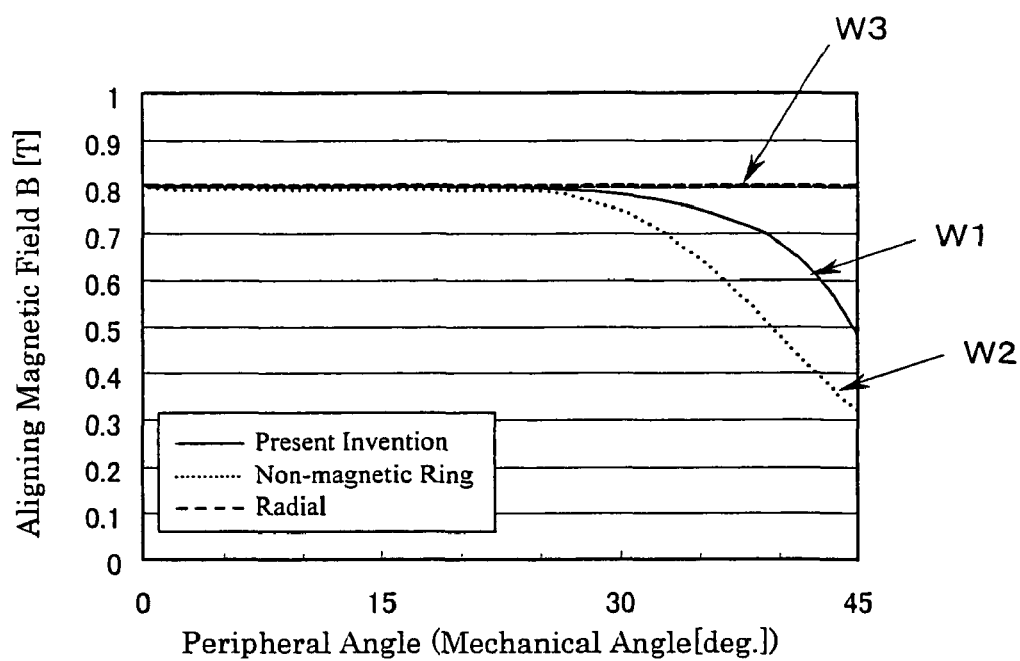

Pole piece 42, the four No 1. dice 38, No. 2 ring 36, No. 1 ring 34, and core 32 are parts with extremely small magnetic resistance in the magnetic circuit, so the orienting magnetic field flows converging on those parts. The magnetic transparency of No. 1 dice 38 is far larger than that of No. 2 dice 40. Therefore, the orienting magnetic field is formed as shown in FIG. 6. As shown in FIG. 8, the magnetic field component in the normalized direction for cavity 35 is shown by Br and the magnetic field component in the direction tangential to the periphery is shown by B θ. Because No. 2 ring 36 which is a magnetic body is provided at this time, part of the aligning magnetic field is induced along No. 2 ring 36, goes around into the No. 2 dice which are non-magnetic bodies, and part of this magnetic flux leaks into cavity 35. That is, in cavity 35, aligning magnetic field B θ in the direction tangential to the periphery is formed in transition region A. The result of this is that it is possible to obtain a 4-pole bonded magnet with an alignment distribution in which, in the transition region in which the direction of the magnetic poles change, the alignment direction of the anisotropic rare-earth magnet powder points in a direction tangential to the periphery of the cylindrical side at locations gradually closer to the neutral point of the magnetic poles, and points in a direction tangential to the periphery at that neutral point, and points in the normalized direction of the cylindrical side at locations gradually further from the neutral point. Also, absolute value B of the aligning magnetic field has the properties shown by curve W in FIG. 9. In transition region A, it is understood that an aligning magnetic field greater than 0.5T is obtained. On the other hand, as disclosed in patent documents 2 and 3, in the case of making the No. 2 ring 36 of non-magnetic material, absolute value B of the magnetic field inside the cavity has the properties shown by curve W2 in FIG. 9. Absolute value B of the magnetic field in transition region A clearly decreases in comparison to the case of the present invention, and it is understood that the 0.5T necessary for alignment of the anisotropic rare-earth bonded magnet is not obtained. Particularly, at measurement point R4 shown in FIG. 8, 0.5T is obtained. In the case of radial alignment obtained by applying a magnetic field from both sides in the axial direction, as shown by curve W3 in FIG. 9, it is understood that a fixed aligning magnetic field B is obtained across all regions.

In the above structure, the angle which is made the center of axis 11 of arc-shaped No. 2 dice 40a, 40b, 40c, and 40d, the region of about 22.5 degrees, corresponds to transition region A of FIG. 1. The angle which is made the center of axis 11 of No. 2 dice 40a, 40b, 40c, and 40d, the region of about 67.5 degrees, corresponds to transition region B of FIG. 1. It is possible by this structure to obtain alignment of the anisotropic rare-earth magnet powder as shown in FIG. 1. If a bonded magnet aligned in this manner is magnetized, it is possible to obtain a surface magnetic flux density distribution in the normalized direction as shown in FIG. 2.

Anisotropic rare-earth bonded magnet 10 is also called a plastic magnet, and representatively, is formed by mixing Nd-Fe-B magnet powder with resin material. Mass production of this magnet has finally been made possible in recent years by the present applicants. For example, this anisotropic rare-earth bonded magnet 10 is produced by the production method according to Japanese Unexamined Patent Application (Kokai) p2001-76917A, Registration Number 2816668. This anisotropic rare-earth bonded magnet has a maximum energy product of 10MGOe to 28MGOe and can be produced at present.

Otherwise, ingredients for the anisotropic rare-earth bonded magnet, may be, other than Nd-Fe-B, Nd-Fe-B related material, for example material including Nd and a rare-earth element other than Nd, or material including other additional elements. Further, material including rare-earth elements other than Nd, for example Sm-Fe-N material or SmCo material, or mixtures of these, may be used. This magnet is characterized in that maximum energy product ($BH_{max}$) is more than four times greater than that of conventional sintered ferrite magnets. That is, while standard sintered ferrite magnet 23 has a maximum energy product (BHmax) fo 3.5 MGOe, the anisotropic rare-earth bonded magnet has a maximum energy product of more than 14 MGOe, which is more than four times greater than that of the conventional sintered ferrite magnet. This means that if motor torque is made the same as in the conventional technology (equivalent torque condition), the thickness of the permanent magnet can be reduced to about one-fourth.

A publicly known unit diameter may be used for the magnet powder. For example, about 1 um average unit diameter in ferrite powder, and 1 to 250 um in rare-earth powder. Publicly known material may be used for the resin. Polyamide synthetic resin such as nylon 12 and nylon 6, independent or copolymer vinyl synthetic resin such as polyvinyl chloride, those vinyl acetate copolymers, MMA, PS, PPS, PE, and PP, thermoplastic resin such as urethane, silicone, polycarbonate, PBT, PET, PEEK, CPE, Hypalon, neoprene, SBR, and NBR, or thermosetting resin such as phenol or epoxy resin can be used. It is possible to use a publicly known mixture ratio of the magnet powder and synthetic resin. For example, it is possible to make that mixture ratio 40 to 90 volume percent. Also, it is possible to use plasticizers, antioxidants, surface treatment agents and the like according to one's purpose.

It is possible to apply the following conditions as production conditions. Heat-hardening resin was used in the embodiment, but thermoplastic resin may also be used. Press molding was used in the embodiment, but other publicly known production methods may be used. Because press molding and magnetic field alignment were performed simultaneously in the embodiment, magnetic field heated press molding was used. First, molding conditions were made to be die 120 deg. C., molding pressure 3.0 T/cm2, molding time 15 sec., aligning magnetic field in the main region of the polar period was 0.80 T, and aligning magnetic field in transition region A in which the direction of the magnetic poles changes was 0.70 T (value at measurement point R4 in FIG. 8). Measurement of the aligning magnetic field in transition region A was at the location shown in FIG. 8. The center line in the peripheral direction of cavity 35 is L1, the center line of No. 2 dice 40a is L3, and the normalization line at point R3 of the angle of No. 2 dice 40a is L2. The intersection of normalization line L2 and center line L1 is R3, and the intersection of normalization line L3 and center line L1 is R1. The magnetic field at center point R4 of points R1 and R3 on center line L1 was measured with a hall element. The angle position of center point R4 corresponds to the location of 39.375 degrees in the properties of FIG. 9, and 84.375 degrees in the properties of FIG. 2.

Next, an anisotropic bonded magnet was molded with No. 2 ring 36 thickness of 2 m, saturated magnetic flux density 1.6 T, and cavity 35 width of 1.5 mm. Below, this bonded magnet is referred to as type B. In this case, the aligning magnetic field at point R4 of FIG. 8 was 0.8 T.

The method of alignment is as stated above. Magnetization was performed as follows. A soft magnetic core on the inside of the cylindrical bonded magnet and a soft magnetic yoke were disposed as a magnetizing yoke. The magnetizing magnetic field was the same as the aligning magnetic field, used as a magnetic field parallel to the direction perpendicular to the cylindrical bonded magnet. A pulse magnetic field was employed as the magnetization method, and the magnetizing magnetic field was about 4 T.

Next, with respect to the type A bonded magnet, two types of semi-radially aligned anisotropic rare-earth bonded magnets were made, one with magnet $BH_{max}$ of 22 MGOe and coercivity of 14 kOe, and one with $BH_{max}$ of 21 MGOe and coercivity of 17 kOe.

As a comparison example, when making the No. 2 ring 36 thickness 2 m, saturated magnetic flux density 0.30 T, and cavity 35 width 1.5 mm, the aligning magnetic field at point R4 of FIG. 8 was reduced to 0.45 T. In other words, even when the No. 2 ring 36 is formed from a magnetic body, when the thickness of No. 2 ring 36 is reduced, it is understood that the magnetic field in transition region A of cavity 35 is small.

Likewise, a conventional example of a bonded magnet was made with No. 2 ring 36 being a non-magnetic body. The thickness of the non-magnetic ring corresponding to No. 2 ring 36 was 2 m, saturated magnetic flux density 0 T, and cavity 35 width 1.5 mm, in which case the aligning magnetic field at point R4 of FIG. 8 was 0.48 T. In the case of radial alignment by applying a magnetic field from the axial direction when the thickness of the non-magnetic ring corresponding to No. 2 ring 36 was 2 m, saturated magnetic flux density was 0 T, and cavity 35 width was 1.5 mm, the aligning magnetic field at point R4 of FIG. 8 was 0.80 T. The size of the applied magnetic field was determined such that the magnetic field of cavity 35 in region B in which torque is mainly generated would be 0.80 T.

The type A bonded magnet and radially aligned bonded magnet were respectively made exciting magnets and DC brush motors were produced. Dimensions of the DC brush motors were all made the same. The output torque and cogging torque of these motors was respectively measured. When making the output torque and cogging torque of the DC brush motor using the radially aligned bonded magnet 100%, the DC brush motor using the bonded magnet with the semi-radial alignment of the present embodiment had output torque of 99.6%, and cogging torque of 52.0%.

In the motor using the bonded magnet with the semi-radial alignment of the present embodiment, relative to the motor using a radially aligned magnet, output torque at 99.6% did not decrease, while there was a great reduction in cogging torque at 52.0%. That is, it was possible to obtain the same output torque while reducing only cogging torque to 52.0%. Thus this is a greatly effective improvement in motor properties, preserving high output torque while reducing cogging torque.

The dimensions and properties of the 4-pole DC brush motor using the 4-pole anisotropic rare-earth bonded magnet made according to type A of the present embodiment are shown along with a radially aligned conventional example in Chart 1. The size of the magnet is internal diameter 30 mm, external diameter 33 mm, thickness 1.5 mm, and length 30 mm. The bake yoke has internal diameter 33 mm, external diameter 37 mm, thickness 2 mm, and length 37 mm. The back yoke material is SPCC, the armature material is silicon steel plate, the coil winding is a distribution coil, rated electric current 4.6 A.

[Chart 1]

Figure 10:
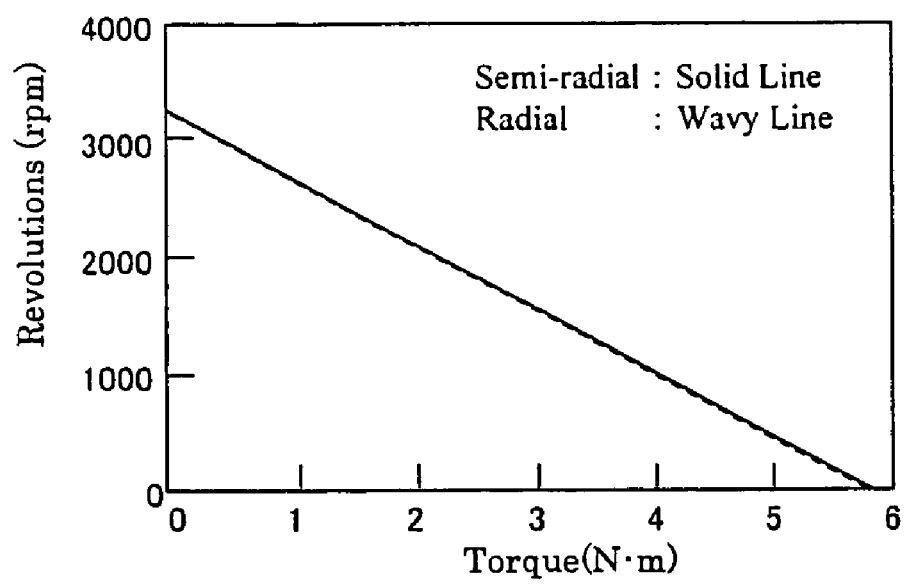

The relationship between torque and revolutions of the motor using the bonded magnet of the present invention is shown in FIG. 10 along with the properties of a motor using the radially aligned bonded magnet of the conventional example. It is understood that the motor using the semi-radially aligned anisotropic rare-earth bonded magnet of the present embodiment does not have properties inferior to the motor using the radially aligned bonded magnet.

Because anisotropic rare-earth bonded magnet 10 is made by resin molding, a hollow cylindrical shape with good precision is formed. Anisotropic bonded magnet 10 is easily precisely symmetrically magnetized. A magnetic field is precisely symmetrically generated inside the motor apparatus.

In the above embodiment, range B with a mechanical angle of about $3\pi/8$ is made the mechanical angle region in which torque is mainly generated, and range A with a mechanical angle of about $\pi/8$ is made the transition region in which the direction of the magnetic poles changes. However, the transition region has a range of about a 30 degree mechanical angle, and it is possible to use a range of about 15 degrees. Then the range which mainly generates torque will be the remaining angular region.

The anisotropic bonded magnet of the present invention, produced by the processing apparatus of the present invention, can be used as an exciting magnet in a DC brush motor. In this case, it can be used in both the stator and the rotor, and besides DC brush motors, it can also be used in brushless motors, synchronous motors, and the like.

INDUSTRIAL APPLICABILITY

The 4-pole anisotropic rare-earth bonded magnet according to the present invention, and the 4-pole anisotropic rare-earth bonded magnet produced by using the alignment process apparatus according to the present invention, can be used in a motor which reduces cogging torque without reducing output capacity.

TABLE

| | | | | | |
|---|---|---|---|---|---|
| Maximum Energy Product | MGOe | 22 | 22 | 21 | 21 |
| Coercivity iHc | kOe | 14 | 14 | 17 | 17 |
| Alignment Method | | Radial | Semi-radial | Radial | Semi-radial |
| Number of Magnetic Poles | | | 4 | | |
| Magnet Size | Diameter (mm) | | φ33-φ30 | | |
| | Thickness (mm) | | 1.5 | | |
| | Length (mm) | | 30 | | |
| Back Yoke | Diameter (mm) | | φ37-φ33 | | |
| | Thickness (mm) | | 2 | | |
| | Length (mm) | | 37 (Flux Ring Height) | | |
| Armature Coating | (mm) | | 29.6 | | |
| Torque Constant (mN · m/A) | | 32.5 | 32.3 | 30.1 | 30.3 |
| Motor Volume (cm³) | | | 50 | | |
| Motor Weight (g) | | | 280 | | |
| Performance Index T (mN · m/A · cm³) | | 0.65 | 0.65 | 0.60 | 0.61 |
| Magnet Rotation Diameter (mm) | | | φ29 | | |
| Number of Slots | | | 10 | | |

What is claimed is:

1. A 4-pole motor anisotropic bonded magnet, wherein:
the magnet has a hollow cylindrical shape and a maximum energy product greater than 14 MGOe, formed by molding anisotropic rare-earth magnet powders with resin,
wherein, in a cross section perpendicular to an axis of the anisotropic bonded magnet having a main region of a magnetic pole and a transition region in which a direction of the magnetic pole changes,
an alignment direction of the anisotropic rare-earth magnet powders is normal to a lateral side of the hollow cylindrical shape in the main region, and
the alignment direction gradually points from a normal direction towards a direction tangential to a periphery of the lateral side of the hollow cylindrical shape approaching to a neutral point of the magnetic pole in the transition region, and
the alignment direction becomes a direction tangential to the periphery of the lateral side of the hollow cylindrical shape at the neutral point in the transition region, and the alignment direction gradually points from a tangential direction toward a direction normal to the lateral side of the hollow cylindrical shape going away from the neutral point in the transition region, and
wherein the anisotropic rare-earth magnet powders align an entirety of the transition region at the degree of alignment greater than 95%, and the 4-pole motor anisotropic bonded magnet in which the alignment direction is formed is magnetized in the alignment direction.

2. The 4-pole motor anisotropic bonded magnet according to claim 1, wherein the alignment direction of the anisotropic rare-earth magnet powders in the transition region is performed with an aligning magnetic field of greater that 0.5 T.

3. The 4-pole motor anisotropic bonded magnet according to claim 2, wherein, for a surface magnetic flux density distribution with respect to a normal direction of the lateral side of the hollow cylindrical shape in the main region of the magnetic pole after magnetization of the anisotropic bonded magnet, a ratio of a difference between a maximum value and a minimum value to an average value in this main region is 0.2 or less.

4. A motor having the 4-pole motor anisotropic bonded magnet according to claim 3.

5. A motor having the 4-pole motor anisotropic bonded magnet according to claim 2.

6. The 4-pole motor anisotropic bonded magnet according to claim 1, wherein, for a surface magnetic flux density distribution with respect to a normal direction of the lateral side of the hollow cylindrical shape in the main region of the magnetic pole after magnetization of the anisotropic bonded magnet, a ratio of a difference between a maximum value and a minimum value to an average value in this main region is 0.2 or less.

7. A motor having the 4-pole motor anisotropic bonded magnet according to claim 6.

8. A motor having the 4-pole motor anisotropic bonded magnet according to claim 1.

9. The 4-pole motor anisotropic bonded magnet according to claim 1, wherein the anisotropic rare-earth magnet powders comprise at least Nd.

10. The 4-pole motor anisotropic bonded magnet according to claim 9, wherein the alignment direction of the anisotropic rare-earth magnet powders in the transition region is performed with an aligning magnetic field of greater than 0.5 T.

11. A motor having the 4-pole motor anisotropic bonded magnet according to claim 10.

12. A motor having the 4-pole motor anisotropic bonded magnet according to claim 9.

* * * * *